United States Patent [19]
Bennett et al.

[11] Patent Number: 4,529,433
[45] Date of Patent: Jul. 16, 1985

[54] SPRING LOADED STOP MEMBER FOR GLASS SHEET SHAPING MOLDS

[75] Inventors: Terry A. Bennett, Verona; William B. Zimmerman, Pittsburgh; Barry L. Shadle, Leechburg, all of Pa.

[73] Assignee: PPG Industries, Inc., Pittsburgh, Pa.

[21] Appl. No.: 616,622

[22] Filed: Jun. 4, 1984

[51] Int. Cl.³ ............................................. C03B 23/025
[52] U.S. Cl. ........................................ 65/273; 65/106; 65/287; 65/289
[58] Field of Search .............. 65/25.4, 106, 107, 273, 65/287, 289

[56] References Cited

U.S. PATENT DOCUMENTS

| | | | |
|---|---|---|---|
| 2,570,309 | 10/1951 | Black | 65/273 |
| 2,695,476 | 11/1954 | Jendrisak | 65/289 |
| 2,729,032 | 1/1956 | White | 65/289 |
| 2,744,359 | 5/1956 | Jendrisak | 65/287 |
| 2,758,422 | 8/1956 | Jendrisak | 65/287 |
| 2,774,189 | 12/1956 | Jensrisak | 65/289 |
| 2,798,338 | 7/1957 | Jendrisak | 65/287 |
| 2,814,164 | 11/1957 | Carson et al. | 65/289 |
| 2,840,953 | 7/1958 | Black | 65/289 |
| 2,859,561 | 11/1958 | Jendrisak | 65/289 |
| 2,901,866 | 9/1959 | McKelvey et al. | 65/289 |
| 3,060,708 | 10/1962 | Stickel | 65/289 |
| 3,089,319 | 5/1963 | Carson et al. | 65/289 |
| 3,103,430 | 9/1963 | Jendrisak | 65/289 |
| 3,162,523 | 12/1964 | McKelvey et al. | 65/289 |
| 3,220,822 | 11/1965 | Jendrisak | 65/289 |
| 3,230,067 | 1/1966 | Carson et al. | 65/289 |
| 3,468,645 | 9/1969 | McMaster et al. | 65/107 X |
| 3,846,104 | 11/1974 | Seymour | 65/273 |
| 4,217,126 | 8/1980 | Hagedorn et al. | 65/273 |
| 4,272,275 | 6/1981 | Reese | 65/273 |

Primary Examiner—Arthur Kellogg
Attorney, Agent, or Firm—Andrew C. Siminerio; Edward I. Mates

[57] ABSTRACT

Glass edge engagement members for use with an outline bending mold having mold portions with upwardly facing shaping surfaces are spring biased to enable the glass edge engaging members to move between an extended position above the shaping surface due to spring biasing force and a retracted position due to abutment force that opposes the spring biasing force when said outline bending mold abuts another shaping mold.

5 Claims, 9 Drawing Figures

SPRING LOADED STOP MEMBER FOR GLASS SHEET SHAPING MOLDS

BACKGROUND OF THE INVENTION

The present invention relates generally to the production of bent glass sheets, and, more particularly, to an improved apparatus for bending glass sheets to special configurations that incorporates an S-shaped transverse bend as well as a longitudinal bend. More specifically, this invention relates to special stop members of a particular structure particularly useful with outline molds used to shape glass sheets to such complicated shapes.

Bent glass sheets are commonly used as glazing closures in vehicles such as automobiles and the like. For such applications, the glass sheets must be bent to precisely defined curvatures dictated by the configuration and outline of the vehicle openings in which the sheets are to be installed as well as the overall styling of the vehicle. At the same time, it is important that the bent sheets meet very stringent optical requirements so that the viewing area of the resulting shaped window is free of optical defects that would interfere with good vision through the window. For certain windows used as glazing closures, the bent glass sheets are tempered to strengthen them and increase their resistance to damage resulting from impact. Furthermore, in the less frequent breakage of tempered glass, the resulting particles are relatively small and smoothly surfaced and thus are less likely to cause damage to an occupant of a vehicle than untempered glass, which fractures under less severe loads and causes particles having jagged edges of a larger size that are more likely to injure vehicle occupants.

In recent years, the glass sheets have been press bent into complicated shapes while suspended from tongs. However, tongs tend to penetrate into the major surfaces of the glass and provide localized portions that have poor optical properties as well as providing mechanical weakness for the glass in the vicinity of the points gripped by the tongs.

It has also been customary in the glass sheet bending art to press bend glass sheets supported in a horizontal position, either on a series of conveyor rolls, or by a gaseous hearth bed which supports the glass in close relation thereover by hot gas, lifting the glass sheet on a vertically movable outline mold from proximity to the support plane provided either by conveyor rolls or the gaseous support bed into engagement with a vacuum holder and then depositing the glass onto a ring-like member which is interposed between the plane of support and the bottom surface of the vacuum holder. Prior to the present invention, most of the shapes produced by such apparatus were either simple bends or compound bends comprising fairly simple curvatures in both mutually perpendicular directions. The need for a glass sheet alignment member becomes greater when the glass sheet is to be shaped to a more complicated shape defined by a downwardly facing surface of a vacuum mold and by an upwardly facing surface of complementary shape of the vertically movable outline lifting mold. Furthermore, when the glass sheet is shaped by moving the sheet while heat-softened over a gaseous hearth bed having a downwardly curved downstream end portion that curves downward to cause the glass sheet to flow downward and sag along its leading edge portion, it is important to have alignment means in position to engage the leading edge of the glass sheet even when the vertically movable outline mold occupies a recessed position. It is equally important that once the glass sheet is properly aligned, it remains aligned until it is engaged by vacuum against the downwardly facing shaping surface of the upper vacuum mold.

U.S Pat. No. 2,570,309 to Black discloses apparatus for bending a single glass sheet by a combination of gravity sagging a heated glass sheet on an outline mold and then lifting the sagged glass sheet while still hot off the outline mold onto a solid lower pressing mold that engages the hot glass sheet against an upper pressing mold of complementary shape to complete its shaping by press bending and then returning the press bent glass sheet to the outline mold. No edge alignment means is depicted in this patent to insure that the glass sheet is properly aligned with the outline mold and between the pressing molds.

U.S. Pat. No. 2,695,476 to Jendrisak and U.S. Pat. No. 2,729,032 to White disclose outline molds that have glass edge engaging members that pivot inward to follow the edges of the glass sheet as it sags toward the outline mold. The glass edge engaging members must be removed manually to remove the bent glass sheet from the mold. Other patents showing this feature includes U.S. Pat. Nos. 2,744,359; 2,758,422; 2,774,189; 2,798,338 and 2,859,561, all to Jendrisak.

U.S. Pat. No. 2,814,164 and U.S. Pat. No. 3,089,319 to Carson and White disclose outline molds having universally pivotable stops that follow and engage pointed tips at the opposite longitudinal edges of glass sheets supported for bending on the outline mold to control tip overbending as well as positioning.

U.S. Pat. No. 2,840,953 to Black and U.S. Pat. No. 3,023,542 to Babcock disclose bimetal actuators attached to glass edge guide members to change the location of the guide members in response to a change in temperature during the bending cycle. When the mold is cool, the bimetal actuators position the edge guides into proper positions for aligning a glass sheet edge. When the mold is heated to heat soften the glass, the bimetal actuators move the edge guide members out of contact with the glass, thus losing the contact between the guide members and the glass sheet edge that maintains the glass in proper mold alignment.

U.S. Pat. No. 2,901,866 and U.S. Pat. No. 3,162,523 to McKelvey and U.S. Pat. No. 3,103,430 to Jendrisak disclose outline molds with counterweighted, pivoted glass engaging members that pivot against the glass sheet edge as the glass sags toward the shaping surface of the outline mold. No provision is made to disengage the glass edge after the glass bend is completed except for manual operation.

U.S. Pat. No. 3,060,708 to Stickel discloses a sectionalized mold having glass edge engaging members mounted to move away from the glass edge as the mold sections close to provide a substantially continuous outline shaping surface. The alignment is lost as soon as the engagement members disengage from the glass edge.

U.S. Pat. No. 3,220,822 to Jendrisak discloses sectionalized outline molds having a pivoted end portion for each end mold section that follow the ends of the glass sheet as the latter shortens from a flat shape to a shape curved in elevation. Manual operation is also required here to separate the end portions from the bent glass sheet.

U.S. Pat. No. 3,230,067 to Carson and Stickel discloses an outline sectionalized shaping mold comprising pivotally supported shaped members that serve both as edge guides and supports for the flat glass sheet that rotate outwardly from the guided side edges as the mold closes and the glass sheet sags. Outward rotation permits the likelihood of glass sheet misalignment during shaping.

U S. Pat. No. 3,846,104 to Seymour illustrates a number of Patents that shape glass sheets to a non-uniform shape by delivering one or more heat-softened glass sheets at a time into a position at a shaping station over a gaseous hearth bed having an upwardly facing surface beneath an upper vacuum mold. A lower outline pressing mold of complementary shape is located in vertical alignment below the upper vacuum mold and moves between a retracted position below the upper surface of the bed and an upper position near the upper vacuum mold. The lower outline pressing mold rises to engage the glass sheet(s) against the upper vacuum mold to cause the heat-softened glass sheet to develop a shape conforming to that of the vacuum mold. Suction applied to the upper vacuum mold holds the shaped glass sheet against its lower shaping surface while the lower outline pressing mold retracts to enable a ring-like member having an outline shaping surface that conforms to the supported portion of the glass sheet adjacent its perimeter to shuttle into position below the vacuum mold. The vacuum on the vacuum mold is ended and the shaped glass sheet falls onto the ring-like member which supports the shaped glass sheet adjacent its perimeter for transfer to a cooling station where the glass is cooled sufficiently rapidly to develop a desired degree of temper. To the best of our knowledge, no apparatus of this type has been developed to shape glass sheets to a compound bend comprising a transverse bend component of S-shaped configuration and a longitudinal bend component of concave elevation.

U.S. Pat. No. 4,217,126 to Hagedorn et al. discloses press bending apparatus for bending glass sheets to compound curvatures including a reversely curved portion that is bent in a direction opposite the direction at which a glass sheet sags. The apparatus of this patent comprises a tunnel heating furnace, a shaping station having an upper shaping mold, a discontinuous ring-like lower shaping mold having a downwardly curved transversely extending shaping rail adjacent the furnace, shaping pads within the outline of the ring-like lower shaping mold, a pair of piston-actuated stops, and a series of spaced, special conveyor rolls that support a heat-softened glass sheet for movement into the shaping station where the lower shaping mold and shaping pads lift the glass sheet into engagement with the upper shaping mold and then retract to enable the special conveyor rolls to convey the bent glass to a cooling station. The lack of a continuous edge support for the shaped glass results in edge wrinkles. Also, the location of the downwardly curved transversely extending shaping rail adjacent the furnace complicates the shaping operation because this patent tries to impart a transverse bend to the trailing end portion of a glass sheet and the temperature gradient established along the glass sheet length comprises a more readily shapable hotter leading end portion and a less hot trailing end portion that is less likely to sag than the hotter leading end portion. Furthermore, since this patent uses stops actuated by pistons, the latter must be operated precisely in timed sequence to the other steps of a bending operation and, therefore, may require maintenance.

U.S. Pat. No. 4,272,275 to Reese discloses apparatus for press bending glass sheets that are sag bent to an outline shape of an outline mold and are conveyed into a compound bending station having upper and lower press bending molds of complicated shape including a transverse bend of S-shaped configuration. There, the lower press bending mold lifts the preliminarily bent glass sheet into engagement with the upper press bending mold to develop a compound glass sheet shape. The lower press bending mold lowers to redeposit the compound bent glass onto the outline mold. The apparatus of this patent includes glass edge engaging members for the outline mold that occupy a glass engaging position during one phase of a shaping cycle (such as when the glass is initially conveyed on the outline mold to develop a longitudinal component of bend) and are suddenly and automatically removed from glass edge engagement immediately before the longitudinally bent glass is lifted from the outline mold for further processing. Such glass edge engaging members cannot continue to align the glass sheet on the outline mold when returned thereto after further processing. In addition, the glass edge engagement members must be reset in proper position by hand for a subsequent cycle.

It would be beneficial for the glass sheet shaping art to develop apparatus for bending glass sheets to a compound bend including a transverse bend component of S-shaped configuration and a longitudinal bend component that includes glass edge alignment members that establish a position of alignment for a glass sheet arriving at a shaping station and that maintains the alignment with the complicated shape of a vacuum mold by incorporating glass edge alignment members that remain in glass locating position from the time the glass sheet arrives over an outline lifting mold and remains in place throughout its lifting into engagement with the upper vacuum mold without causing damage to the glass edge or any shaping station parts.

BRIEF DESCRIPTION OF THE PRESENT INVENTION

The present invention is preferably incorporated in a lower lifting mold having an outline configuration comprising a first longitudinal rail portion extending transversely of the path immediately upstream of a gaseous hearth bed, a pair of transverse rail portions flanking the opposite sides of the gaseous hearth bed and extending longitudinally of said path, and a second longitudinal rail portion of S-shaped transverse configuration extending transversely of the path and located immediately downstream of the gaseous hearth bed.

Elongated slots are provided in the second longitudinal rail portion to receive the lower ends of glass edge engaging members. The latter are spring loaded and extend upward from a cylindrical housing supported by a rigid reinforcing frame for the outline lifting mold. The spring loaded stops begin to retract when they are lifted into engagement against an upper vacuum mold while the lifting mold raises the heat-softened glass toward the vacuum mold. The yieldability of the springs avoids damage of the stop members or of the vacuum mold. The stops are adjustably positioned in locations that the leading edge portions of the glass sheet reach when the glass sheet arrives at a proper position within the shaping station. The spring loaded stop members of the present invention form part of apparatus described and claimed in a copending U.S. patent application Ser. No. 616,764, filed on the same date as this application, of Terry A. Bennett, George R. Claassen and William B. Zimmerman for BENDING GLASS SHEETS TO COMPLICATED SHAPES INCLUDING AN S-SHAPED TRANSVERSE BEND. While the specific embodiment illustrating this invention discloses a mold with two stop members, it is understood that the number may be varied without departing from the scope of the present invention. The location around the perimeter of an outline mold may also be modified as required by the pattern of the glass sheet bending mold.

The benefits of the present invention will be understood more clearly in the light of a description of a preferred embodiment that follows.

BRIEF DESCRIPTION OF THE DRAWINGS

In the drawings that form part of a description of preferred embodiment of the present invention.

DESCRIPTION OF PREFERRED EMBODIMENT

Figure 1:
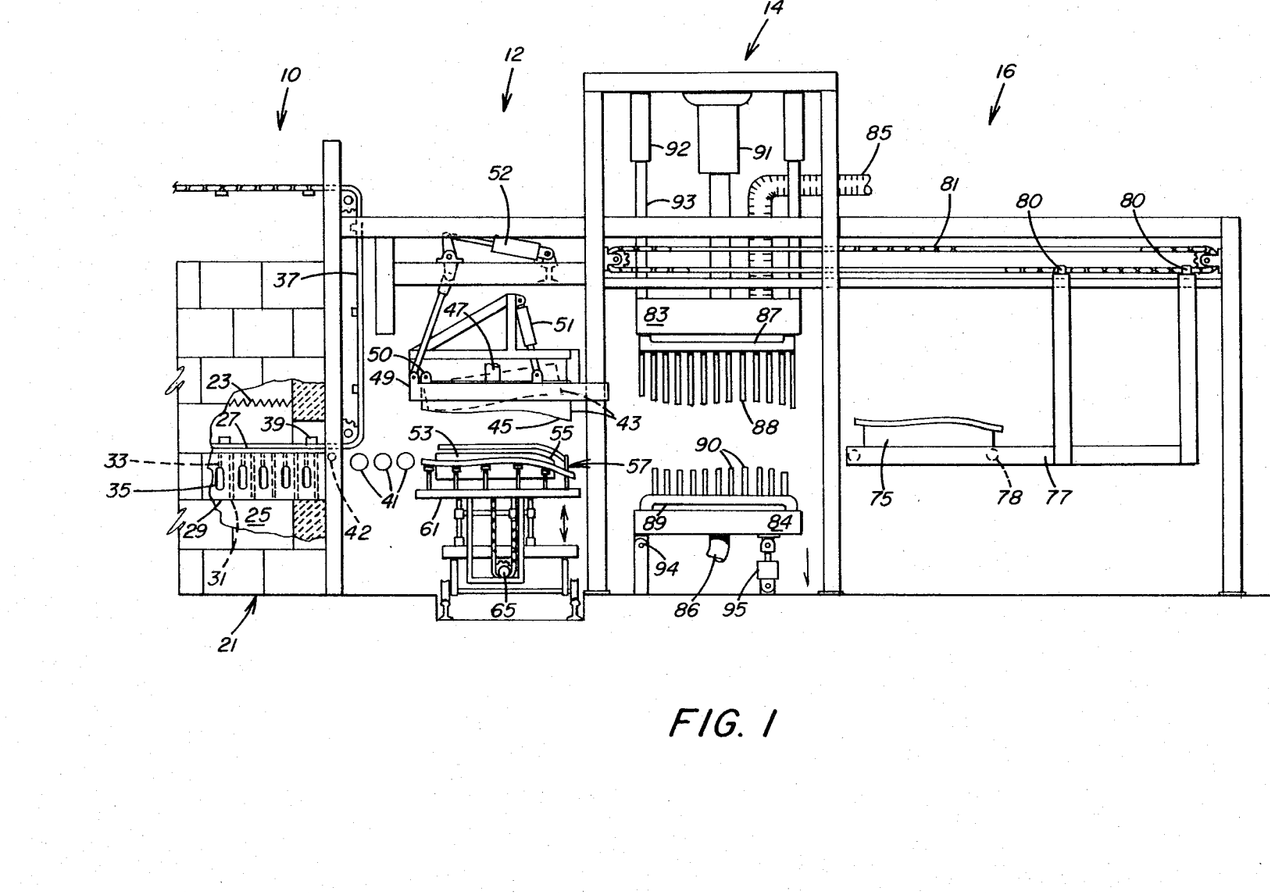
FIG. 1 is a partial longitudinal elevational view of apparatus for bending and tempering glass sheets having a shaping station modified according to the present invention with parts omitted to show other parts more clearly.

Referring to the drawings, and particularly FIG. 1, a typical apparatus comprises a heating area 10, a shaping station 12, a cooling station 14 and an unloading station 16, shown in end-to-end relation. Glass sheets are generally conveyed along a path through the length of the heating area 10 and arrive at the shaping station 12 where they are shaped to the desired configuration and then transported to the cooling station 14. After sufficient exposure to cold blasts at the cooling station, the bent and cooled glass sheet, to which a desired degree of temper has been imparted, is transferred to the unloading station 16 and removed.

More specifically, the heating area 10 comprises a tunnel-type furnace 21 of the gas hearth type having overhead electric heaters 23 and a lower gas hearth plenum 25 providing a gas hearth support surface 27 on the upper surface of an apertured roof 29 of the gas hearth plenum 25. It is understood that this type of controlled heating system is recited by way of example and is not limiting to the present invention.

The temperature along the furnace length is controlled by computers in a manner well known in the art. A Digital Electronic Corporation PDP 11/24 Host computer and a PDP 11/23 microcomputer are preferred for use for temperature control.

The roof 29 is provided with supply passages 31 that extend completely through the thickness of the roof from the gas hearth plenum 25 to the upper surface 27 of the roof 29. In addition, exhaust passages 33 extend downward from the upper surface 27 into cross passages 35 intermediate the thickness of the roof 29 to provide exhaust passageways for hot gas that is supplied in an upward direction through supply passages 31 to provide a thin layer of hot gas upon which glass sheets are supported during their conveyance through the tunnel-like furnace 21.

A pair of driving chains 37 each having transversely aligned lugs 39 interconnected by a cross bar (not shown) is provided to cause a series of spaced glass sheets floated through the tunnel-type furnace 21 to be conveyed to the exit end of the furnace. During the transfer of the glass sheets, the heat applied through the overhead electrical heaters 23 and from the gas hearth plenum 25 is so arranged that the leading edge of the glass sheet arrives at the exit of the furnace at a slightly higher temperature than the trailing edge.

Also included is a glass sensing mechanism 42 which determines the location of a glass sheet either by magnetic detection of a specific lug 39 or which detects a glass sheet directly, such as an optical or electrical glass sensing device. The sensing mechanism initiates operation of a programmable controller (not shown) that determines the sequence for operating various actuating means to be disclosed hereinafter so as to ensure that the apparatus operates in proper synchronism.

A preferred controller for this purpose is a Modicon 384 programmable controller. While the glass sensing mechanism is shown at the exit end of the furnace for illustration, it is understood that such a device may be located anywhere along the glass movement path that is convenient. Immediately beyond the exit of the furnace are a plurality of silica transfer rolls 41 covered by fiberglass sleeves. The transfer rolls 41 bridge the gap between the exit of the furnace 21 and the shaping station 12. The transfer rolls 41 are located in such positions that they define a continuation of the upper surface 27 at which the glass sheets are supported over the gas hearth plenum 25.

The shaping station 12 comprises an upper vacuum mold 43, having a downward facing surface that is curved both longitudinally and transverse to the path of travel defined by the driving chains 37 and the transfer rolls 41 and includes a longitudinal bend about an axis extending longitudinally of the path and a transverse bend extending about an axis transversely of said path. The downstream end of the downwardly facing shaping surface of the upper vacuum mold 43 has a downwardly curved end portion 45 of substantially S-shaped configuration. The upper vacuum mold has a vacuum chamber whose downward facing wall is apertured and is covered by a fiberglass cloth cover (not shown) and communicates to a source of vacuum through a flexible vacuum pipe 47. The upper vacuum mold 43 is supported on a support frame 49. The latter is pivoted on a pivot support 50 at its upstream end portion and its vertical position of the downwardly curved end portion 45 is adjustable through a piston means 51. The support frame 49 is supported for vertical movement relative to overhead structure through vertical adjustment means 52 which includes a piston and linkage arrangement.

Figures 2, 3, 4, 5:
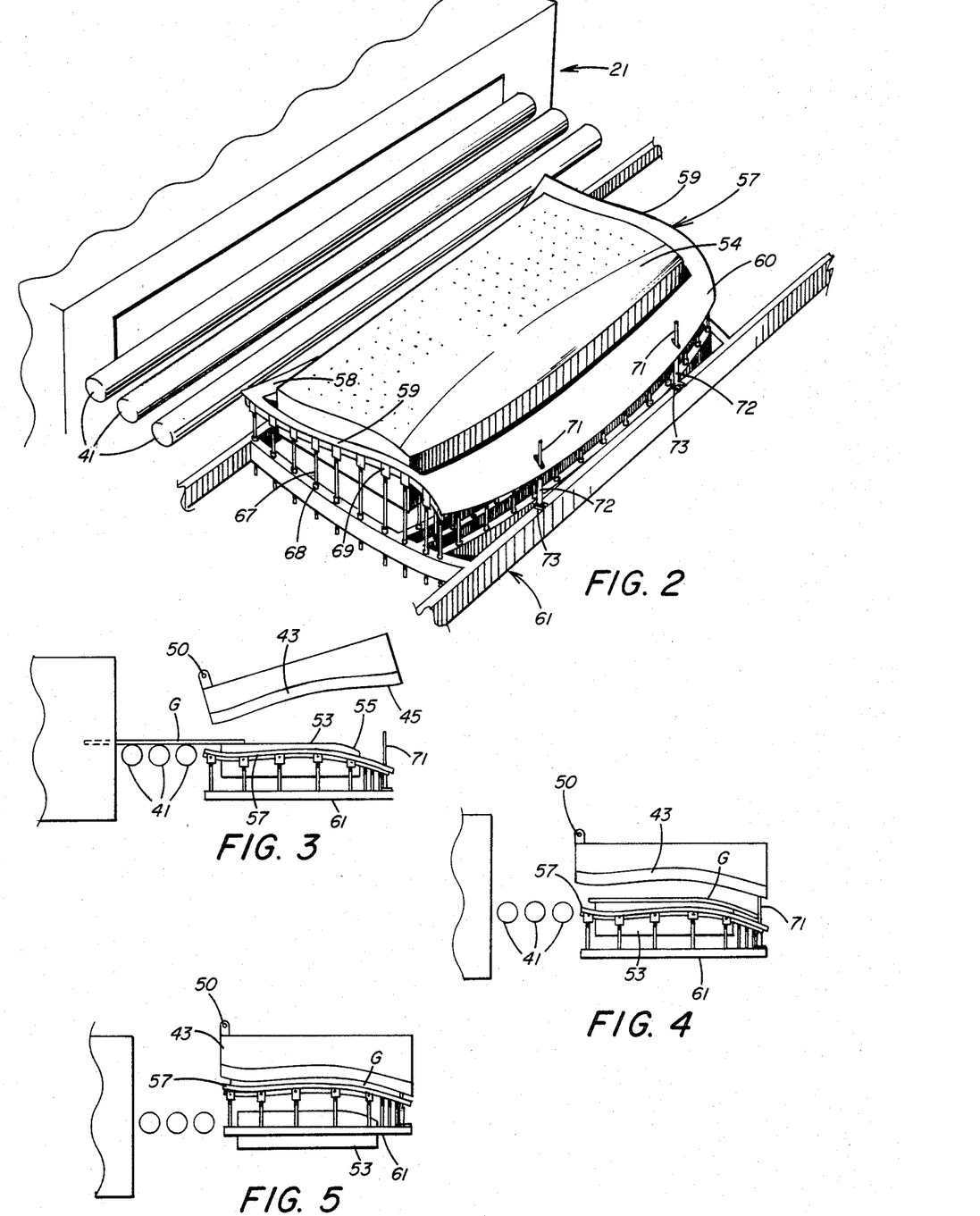
FIG. 2 is a perspective view of the lower portion of the shaping station of FIG. 1, showing an auxiliary gaseous hearth bed with an outline lifting mold disposed in surrounding relation thereto at the shaping station just beyond the exit end of a heating furnace, with parts omitted to show other parts more clearly.
FIG. 3 is a schematic view of a portion of a shaping station showing a glass sheet entering the shaping station.
FIG. 4 is a view of the portion of the shaping station as depicted in FIG. 3 showing the glass sheet after its arrival at its shaping position.
FIG. 5 is a view similar to FIGS. 3 and 4 showing a glass sheet sandwiched between the upper and lower molds of the shaping station of the present invention.

An auxiliary gaseous hearth bed 53 is disposed beneath the downwardly facing shaping surface of the upper vacuum mold 43. The auxiliary gaseous hearth bed has an upper surface provided with a downwardly curved, downstream end portion 55. The latter is curved downwardly both transversely and longitudinally of the path of glass sheet movement when the shape to be made in the glass is concave in elevation transverse to the path and includes an S-shape configuration at the downstream side of the glass sheet. Except for the downwardly curved downstream end portion and difference in size, the auxiliary gas hearth bed 53 is similar to the gas hearth in furnace 21.

In a particular embodiment to form a shape that is concave in elevation in a direction transverse to the path of glass movement and has an S-shaped configuration at the downstream end portion of the glass sheet, the upper surface of the auxiliary gaseous hearth bed 53 is flat except for a downstream end portion that extends downward from a transversely curved boundary 54 that is convexly curved in the upstream direction. The downwardly curved downstream end portion 55 blends downwardly away from the flat upstream surface portion of bed 53 and also blends transversely of the glass path to form a downstream end of concave elevation in the transverse direction and in convex elevation in the longitudinal direction of said path.

Figure 7:
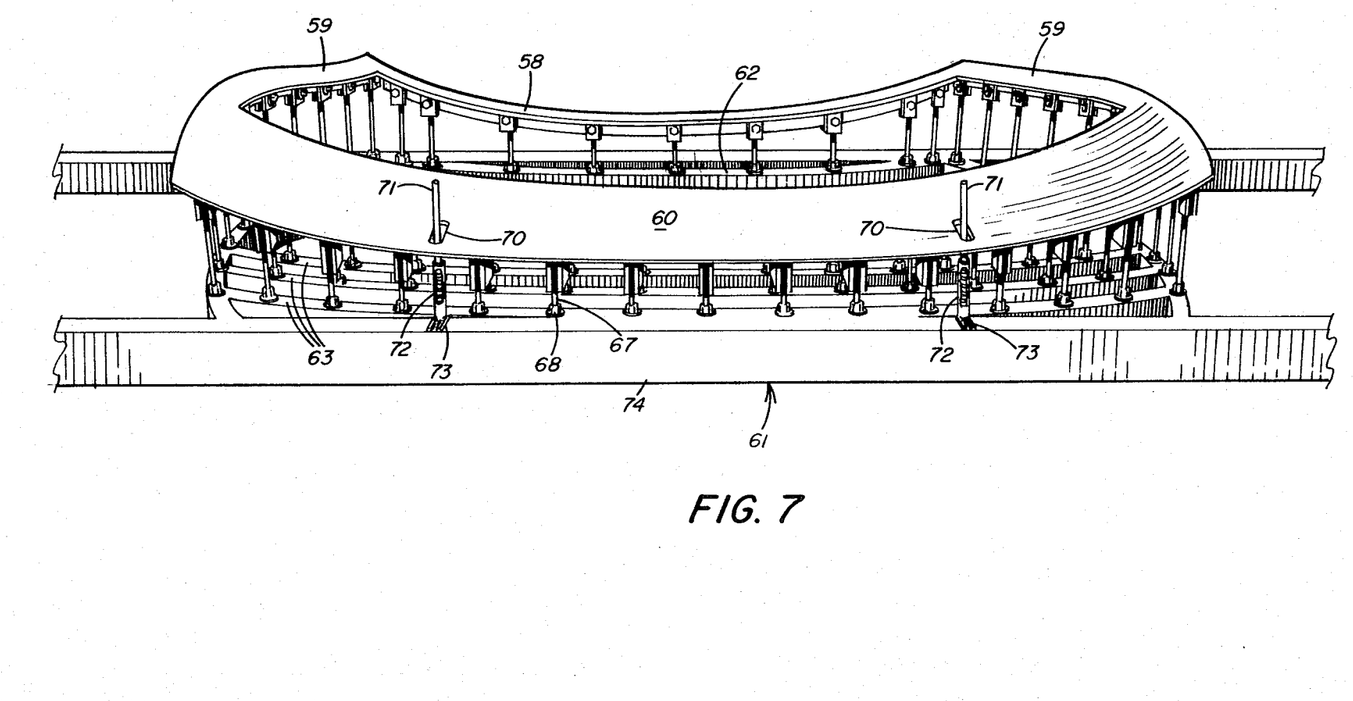
FIG. 7 is a frontal view in perspective of the outline lifting mold incorporating the spring loaded glass edge engagement members of the present invention.

An outline lifting mold 57 surrounds the auxiliary gas hearth bed 53. The outline lifting mold 57 comprises a first longitudinal rail portion 58 of T-shape cross section, having an upper surface of concave longitudinal shape extending transversely of the path of movement defined by the driving chains 37 and the transfer rolls 41 on the side of the auxiliary gas hearth bed 53 that faces the end of the furnace 21. A pair of transverse side rail portions 59, also of T-shape cross section have upper surfaces extend longitudinally of said path. The transverse rail portions 59 are interconnected by a second longitudinal rail portion 60 at the downstream end of the lower shaping mold 57 from the ends of the first longitudinal rail portion 58. The second longitudinal rail portion has an upper surface of transverse S-shape combined with a longitudinal shape of generally concave elevational shape which is provided for the first longitudinal rail portion 58. The latter upper surface of the second longitudinal rail portion 60 has a shape that blends with the shape at the downstream end of the downwardly curved downstream end portion 55.

Each of the rail portions 58 and 59 is composed of a T-shaped metal rail covered by a continuous frame of an alumina-silica paper such as two thicknesses of a paper ⅛ inch (3.2 mm) thick having a typical analysis by weight of 51.9% $Al_2O_3$, 47.9% $SiO_2$, 0.08% $Na_2O$ and 0.1% $Fe_2O_3$. The Paper is made by Carborundum and identified by the trademark Fiberfrax 970J paper. The paper is held in place by wrapping a seamless frame wider than the width of the rail portions and composed of a stretched knit fiberglass cloth fabric that forms a seamless cover over the paper and stapling or clamping together the ends of the fiberglass cloth cover wrapped around the stems of the rails. The rail portion 60 is also covered with paper over which a stretched knit fiberglass cloth fabric cover is wrapped with the free ends of the wrapped fiberglass cloth fabric secured together by staples, pins or clips beneath the rail portion 60.

Figure 6:
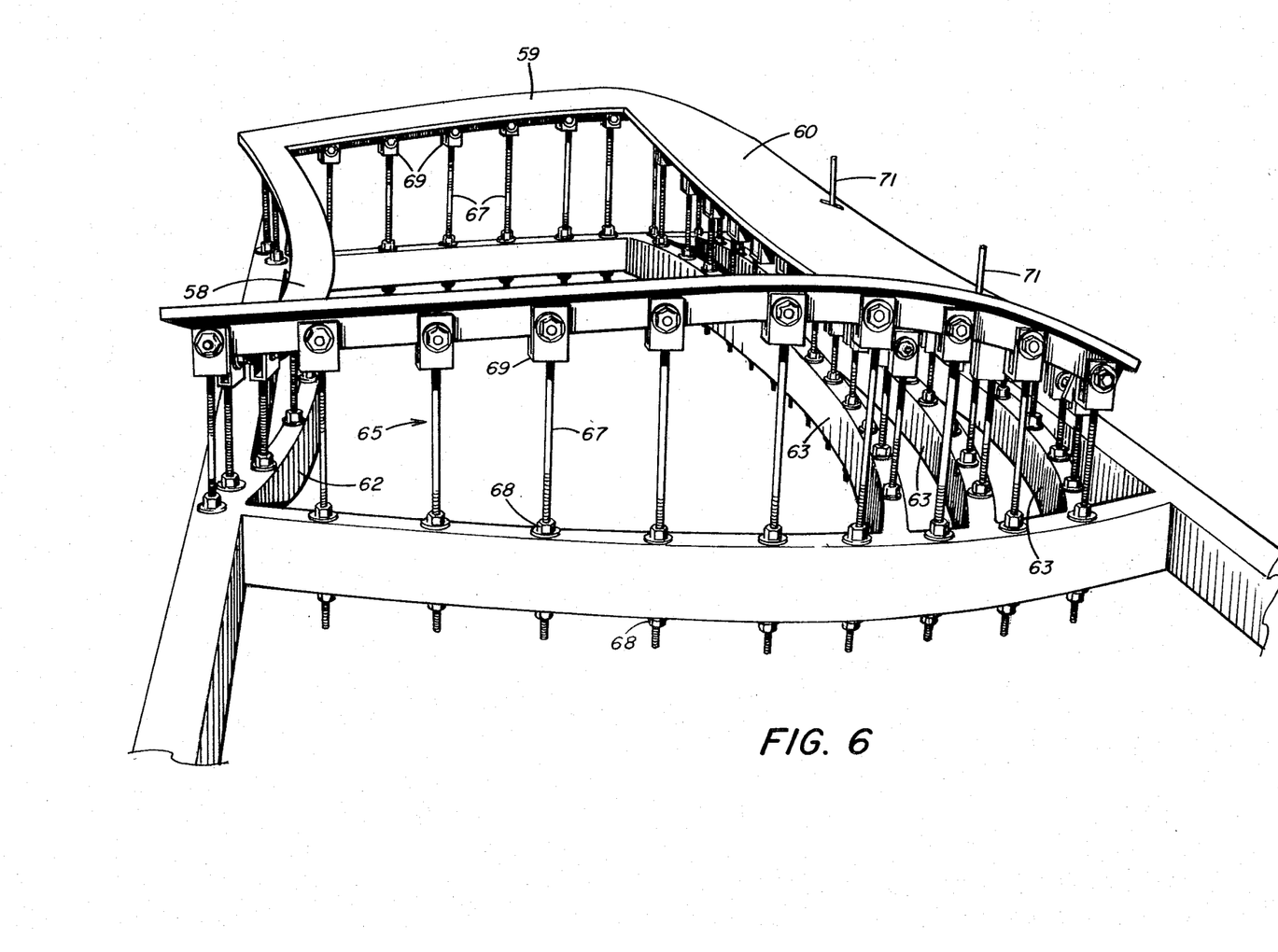
FIG. 6 is a side view of the outline lifting mold of the present invention showing how the shaping rail portions are connected to a reinforcement frame.

The outline lifting mold 57 is supported on a rigid reinforcing frame 61. The rigid reinforcing frame also includes an auxiliary reinforcing beam 62 below the first longitudinal rail portion 58 and curved in plan to conform to the shape of rail portion 58 as well as three auxiliary longitudinal reinforcing beams 63 below the second longitudinal rail portion 60. Elevator means 65 is provided to raise and lower the rigid reinforcing frame 61 together with the outline lifting mold 57. The second longitudinal rail portion 60 is located immediately downstream of the downstream end of the downwardly curved end portion 55 of auxiliary gaseous hearth bed 53. It is understood that the number and arrangement of auxiliary reinforcement beams may be changed without departing from the scope of this invention.

Means is provided to adjust the rail portions of the outline lifting mold 57 relative to the rigid reinforcing frame 61 or the auxiliary reinforcing beams 62 or 63. Each of these adjustment means comprises a vertically extending threaded shaft 67 whose vertical position is adjusted relative to either the rigid reinforcing frame 61 or the auxiliary reinforcing beam 62 or 63 by lock nuts 68. A clevis 69 is attached to the upper end of each vertically extending threaded shaft 67. The upper clevises for rail portions 58 and 59 are connected with nuts and bolts to stems extending downward from the first longitudinal rail portion 58 of T-shaped section or each of the transverse side rail portions 59, also of T-shaped cross section.

At least two auxiliary reinforcing beams 63 (three being shown) extend longitudinally in spaced relation below the second longitudinal rail portion 60. The beams are connected along their length to different locations of the second longitudinal rail portion 60 by additional adjustment means including additional clevises 69 bolted to the downwardly extending stems of T-members welded to the undersurface of the second longitudinal rail portion 60 at the upper end of vertically extending threaded shafts 67. The latter are secured near their lower ends to the different auxiliary reinforcing beams 63 in vertically adjusted position using lock nuts 68 as in the previous vertically extending threaded shafts for the other rail portions 58 and 59.

A pair of elongated slots 70 is provided in longitudinally spaced relation along the second longitudinal rail portion 60. Each slot 70 receives one of a pair of spring loaded glass edge engagement members 71. The latter are also referred to herein as stop members. Each stop member 71 is received in an open-ended cylindrical housing 72 and is biased upwardly by a helical spring 101 within the housing to extend upward from said housing. The housing is supported on a slotted support plate 73 that is fixed by locking nuts in an adjustable position to a downstream rectangular pipe member 74 (FIG. 7) of the rigid reinforcing frame 61.

Figures 8, 9:
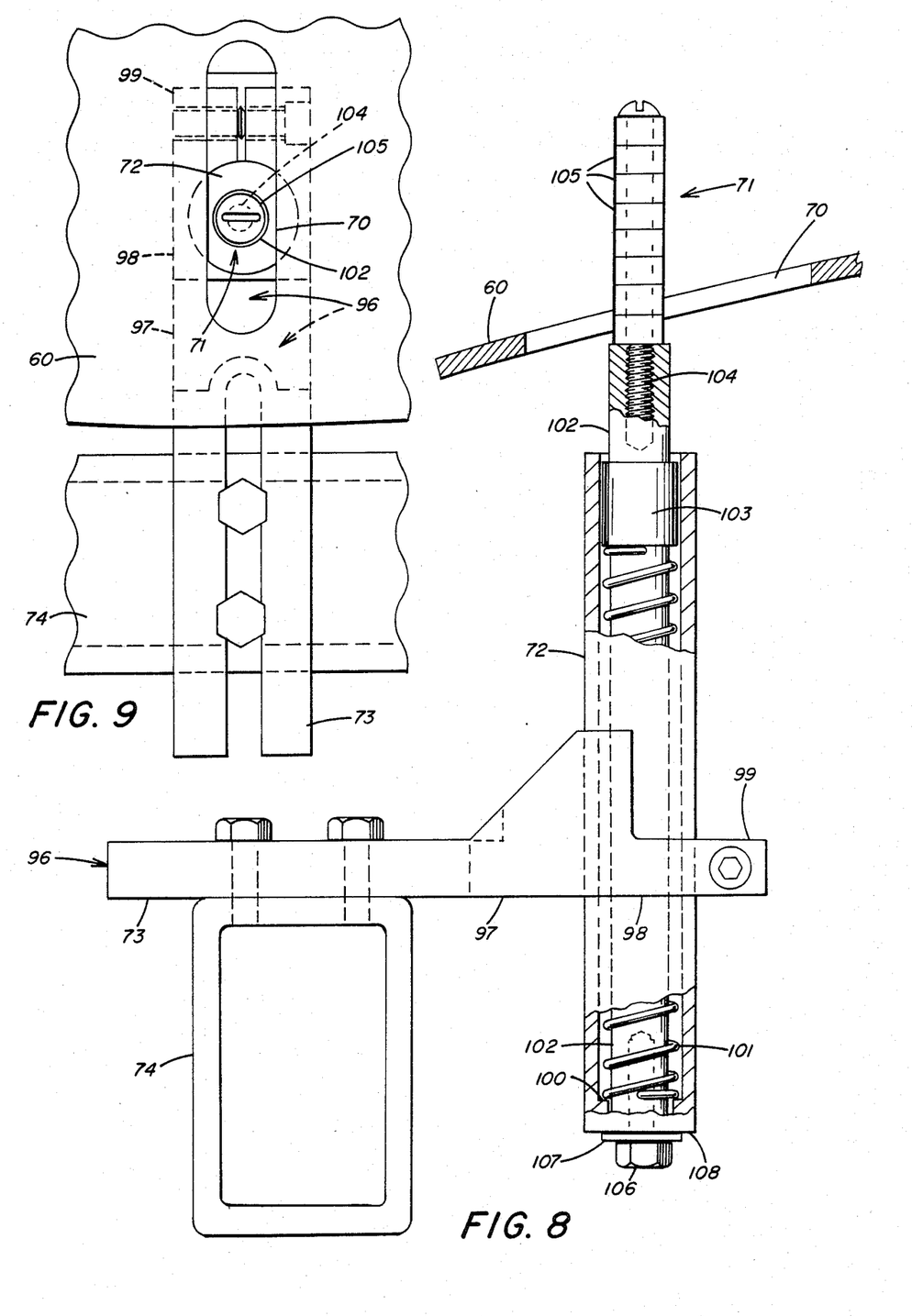
FIG. 8 is an elevational assembly view of a glass edge engaging member with portions broken away to show interior structure of certain components thereof.
FIG. 9 is a plan view of the assembly of FIG. 8.

The slotted support plate 73 forms the outer end of a unitary mounting bracket 96 shown in detail in FIGS. 8 and 9. The mounting bracket also includes a portion 97 of increasing thickness to provide additional rigidity, an apertured portion 98 that receives the open-ended cylindrical housing 72, and a slit inner end portion 99. The latter is cross-bored to receive a tightening screw that adjusts clamping of the bracket 96 around the cylindrical housing 72.

The latter includes an inside bottom shoulder 100 that supports the lower end of helical spring 101. A metal rod 102 extends through the helical spring 101 and inside bottom shoulder 100. A brass bushing 103 is pressed around the upper portion of metal rod 102. The upper end of helical spring 101 presses against the bottom of the bushing 103.

The upper end of metal rod 102 is tapped to receive the lower end of an attachment screw 104. The latter extends through a plurality of axially aligned bushings 105 of graphitic material and secures the bushings 105 to the upper end of the metal rod 102 in axial alignment therewith.

The metal rod 102 is tapped at its lower end to receive a threaded bolt that attaches a wide washer 107 to the bottom end of the metal rod 102. The cylindrical housing 72 includes an outside bottom shoulder 108 that the wide washer 107 is adapted to engage.

The upwardly biased position of the graphite bushings 105 is defined by wide washer 107 engaging outside bottom shoulder 108. When the lifting mold 57 is raised until the uppermost graphite bushing 105 engages the downwardly facing shaping surface of the upper vacuum mold 43, the abutment force compresses spring 101 to retract the bushing 105 until the coils in the helical spring 101 are completely compressed. The coils are only partly compressed when the bushing 105 has its upper edge aligned with the second longitudinally extending rail portion 60.

The vertical position of the cylindrical housing 72 relative to the apertured portion 98 of the mounting bracket 96 is adjusted to a position such that when the glass engaging member 71 is fully extended, the bushings 105 of graphite are completely exposed above the mounting bracket 96 and the metal rod 102 extends from within the cylindrical housing 72 to beyond the bottom of the latter. Also, the number of bushings 105 fixed to the upper end of the steel rod 102 is selected to have the upper bushing 105 in position to engage the leading edge of a glass sheet that enters the shaping station 14 with its leading edge portion flowed downward to sag to the desired configuration.

In a preferred embodiment of this invention, cylindrical housings 72 about 6 inches (15 centimeters) long each enclose a free length spring about 5 inches (12.7 centimeters) long. Each spring is mounted in a space about $4\frac{7}{8}$ inches (12.4 centimeters) long between the inside bottom shoulder 100 and the lower surface of the brass bushing 103. The inner diameter of the cylinder is 0.75 inches (19.05 millimeters). The steel rod 102 is 7 inches (17.78 centimeters) long and has an outside diameter of 0.55 inches (1.4 centimeters). The spring 101 has an outer diameter of 0.72 inches (1.83 centimeters) and a wire diameter of 0.072 inches (0.183 centimeters). The spring deflection rate is 12.5 pounds per inch (0.223 kilograms per millimeter). The number of graphite bushings 105 mounted to the steel rod 102 depends on the depth of glass sheet sag in the location engaged.

A preferred graphite bushing for glass edge engaging member is Graphalloy bushing 117-4-212 supplied by Graphite Metallizing Company of Yonkers, New York. These bushings are $\frac{1}{4}$ inch (6.35 millimeters) thick, have an outer diameter of $\frac{1}{2}$ inch (1.27 centimeters) and an inner diameter of $\frac{1}{4}$ inch (6.35 millimeters). The peripheral surfaces of the graphite bushings engage the glass edge and do not harm the glass during the relative sliding that takes place during a shaping operation.

The bushings 105 which are the glass engaging elements of the spring loaded stop members 71 are preferably composed of graphite or other materials that do not mar hot glass on sliding contact thereagainst in the glass edge contact area held together by a threaded shaft 97 that extends into housing 73. The stop members 71 are located in positions that would normally be attained by the leading edge of a glass sheet that droops over the downwardly curved downstream end portion 55 of the auxiliary gaseous hearth bed 53 when a glass sheet is delivered to the shaping station for bending. The outline lifting mold 57 is located relative to the upper vacuum mold 43 so that the stop members 71 engage the downwardly curved end portion 45 of the upper vacuum mold 43 when the outline lifting mold 57 is lifted. Spring loaded stop members 71, upon engaging the downwardly curved end portion 45 of the upper vacuum mold 43, retract into the cylindrical housings 72 to permit the downwardly curved second longitudinal rail portion 60 to conform with the downwardly curved end portion 45 of the upper vacuum mold 43 and sandwich the downstream edge portion of the glass sheet G therebetween.

The apparatus also includes a ring-like member 75 supported in cantilever relation from a shuttle carriage 77 via cross members 78. The carriage is provided with vertical connecting members 79 to lugs 80 fixed to twin chain drives 81. The chain drives move the carriage 77 and its supported ring-like member 75 in a horizontal path between unloading station 16 and a position beneath the upper vacuum mold 43 above both the upper ends of the fully extended stop members 71 and above the auxiliary gaseous hearth bed 53 when the outline lifting mold 57 is retracted downwardly and then to a downstream position in the cooling station 14. The ring-like member 75 is similar in construction to that of U.S. Pat. No. 3,973,943 to Seymour and comprises a reinforcing metal ring hugging the lower portion of a glass engaging ring or bars of non-metallic material that does not mar glass. A suitable material for the glass engaging bars or ring is a phenolic-aramid laminate sold by Spalding Fiber Co., Inc., of Tonawanda, N.Y. as ARK-2 phenolic-aramid laminate.

The cooling station 14 comprises an upper cooling air plenum 83 and a lower cooling air plenum 84. An upper flexible supply pipe 85 supplies air under pressure to the upper cooling air plenum 83, and a similar lower flexible supply pipe 86 supplies cool air under pressure to the lower cooling air plenum 84. Upper apertured pipes 87 of U-shaped elevation are connected to extend different distances downward from upper air plenum 83 in a configuration transverse to the path of movement taken by the glass to conform to the longitudinal shape of the glass sheet and are provided with nozzles 88 that extend downwardly from downwardly facing apertures of the upper apertured pipes to have the pipe ends form a configuration conforming to the S-shaped transverse configuration of the glass sheet. The lower cooling air plenum 84 is provided with a series of lower apertured pipes 89 of inverted U-shaped elevation connected to extend different distances upward from lower plenum 84 in a configuration conforming to the longitudinal shape of the sheet. Each lower apertured Pipe 89 has upwardly directed apertures from which upwardly extending nozzles 90 extend. The length of the nozzles along the length of the lower apertured pipes is such as to provide a shape conforming to the transverse shape of the glass sheet including the portion having the S-shaped configuration.

An upper piston 91 is connected to the upper plenum chamber 83 to raise and lower the upper plenum as required. Upper guide sleeves 92 slidably support upper guide rods 93 attached to extend upward from the upper plenum chamber 83 to ensure that the movement of the upper plenum chamber 83 is in a vertical direction. The lower plenum chamber 84 is supported on a pivotal support 94 and is actuated for movement between an upper position depicted in FIG. 1 and an oblique position by a lower piston 95. The oblique pivoting of the lower cooling air plenum 84 helps to remove glass fragments in the event of breakage in the cooling station.

The operation of apparatus according to the present invention involves mounting a series of spaced glass sheets at the entrance of the tunnel-like furnace 21 and moving the glass sheets through the furnace at a rate such that the leading edge of the glass develops a slightly higher temperature than the trailing edge of the glass and the lowest temperature of the glass is at least at the deformation temperature of the glass, which is in the range of 1200° F. to 1220° F. (650° C. to 660° C.). The leading glass sheet in the series, when it reaches a position at which it is detected by the glass sensing mechanism 42, actuates the programmable controller (not shown) and is immediately conveyed over the transfer rolls 41 and onto a position above the auxiliary gaseous hearth bed 53.

The leading edge of the glass sheet is sufficiently hot to conform to the downwardly curved shape of the downstream end portion 55 of the auxiliary gaseous hearth bed 53. At a proper time, depending upon the speed of rotation of the transfer rolls 41, which delivers the glass sheet at a higher speed than the speed of the driving chains 37, the leading edge of the glass sheet engages the upwardly biased glass edge engagement members 71 and the elevator means 65 is actuated to lift the outline lifting mold 57.

The outline lifting mold 57 engages a frame-like perimeter portion of the glass sheet and forces it up against the downwardly facing shaping surface of the upper vacuum mold 43. At its downstream end Portion, the downwardly sagged glass sheet portion assumes an S-shaped configuration as it is sandwiched between upper vacuum mold portion 45 and the second longitudinal rail portion 60 of outline lifting mold 57.

The upper vacuum mold 43 which was pivoted initially in the obliquely upward position as shown by the dashed lines in FIG. 1, and also depicted in FIG. 3, is pivoted downward to the position shown in full lines in FIG. 1 and in FIG. 4, while the outline lifting mold 57 moves upward to cause the glass sheet G to develop the transverse shape required. The outline lifting mold 57 and upper vacuum mold 43 also impress a longitudinal bend on the glass sheet about an axis extending longitudinally of the path of movement of the glass. During the upward lifting, the glass sheet edge slides upward relative to the downward retraction of the stop members 70 in response to their upper edges engaging the vacuum mold 43. The graphitic composition of the stop members 70 does not mar the glass edge during said sliding movement.

The leading edge portion of the glass sheet in the downstream direction of the path of glass movement flows downwardly relative to the remainder of the glass sheet. The outline lifting mold 57 is lifted to impress its outline elevational shape on the glass sheet and finally, the glass sheet is sandwiched between the upward facing surface of the outline lifting mold 57 and the downward facing surface of the upper vacuum mold 43. A vacuum is applied to the vacuum mold to engage the glass sheet by vacuum and to ensure that the glass sheet conforms more closely to the shape of the upper vacuum mold. Lifting mold 57 is then lowered to the retracted position, and the ring-like member 75 is transferred into a position below the upper vacuum mold 43. The vacuum mold 43 may be pivoted upward again after it engages the glass sheet to permit the ring-like member 75 to move into position to receive the glass sheet G engaged by vacuum against the lower surface of the vacuum mold 43. After the ring-like member 75 arrives in position beneath the upper vacuum mold 43, the upper vacuum mold 43 is again pivoted to a horizontal disposition, and the glass sheet is released by releasing the vacuum. The glass sheet then drops onto the upper surface of the ring-like member 75 which conforms to an outline shape slightly inward of the glass sheet outline and supports it for movement into the cooling station 14 where the ring-like member 75 is reciprocated linearly while air is blasted against the upper and lower surfaces of the glass sheet at a rate sufficient to impart a desired degree of temper in the glass. When sufficient cooling has taken place, the shuttle carriage 77 moves the ring-like member 75 into the unloading station 16 where the glass sheet is removed from the ring-like member 75 and the latter is returned into a parking position at the cooling station 14 to await the disposition of the next glass sheet. At the same time, the upper vacuum mold 43 which has been again pivoted into an upward oblique position to permit clearance for the next glass sheet to enter the shaping station 12 below the upper vacuum mold 43 remains in such position until such time as the next sheet completes its arrival.

The movement of the various moving elements of the apparatus is synchronized in response to the sensing of a particular glass sheet which sets into motion a series of events based in time sequence as determined by a programmable controller that controls the times at which each element operates after the glass sheet has arrived at the sensing location and is moved toward the shaping station. The upward and downward movement of the upper plenum chamber is also coordinated with movement of the ring-like member 75. The upward and downward movements of the upper vacuum mold 43 and the outline lifting mold 57 are coordinated with the movement of the glass sheet into the shaping station and the subsequent need to release the glass sheet from the vacuum mold 43 onto the outline shaping surface of the ring-like member 75.

Such programmable controllers that coordinate the onset and stopping of activity of moving elements in timed relation after the detection of the presence of the glass sheet or a particular lug 39 of the chain drive 37 that starts a cycle to operate are well known in the art and a preferred device for controlling the movement of the various movable elements is a Modicon 384 programmable controller.

Another manner of sequencing the operations is to initiate a timing sequence using a series of limit switches, each controlling a timer circuit for each actuated element. The first limit switch is actuated by a cross bar connecting a pair of transversely opposing lugs 39, which engages the leading edge of a glass sheet that controls the position of the glass during movement along the length of a tunnel-type furnace in which the gas hearth support surface 27 is sloped slightly downward along its portion approaching the exit of the furnace 21. As the glass sheet is released from the constraint provided by the cross bar extending between the lugs 39, the floating glass sheet traverses the three rotating ceramic rolls 41 covered with fiberglass cloth sleeves and floats over the auxiliary gaseous hearth bed 53 toward its downwardly curved down stream end portion 55. At the start of the cycle, the upper vacuum mold 43 is tilted relative to pivot support 50 so that its downwardly curved end portion 45 is raised to provide clearance for the hot flat glass sheet to move in floating relation over the auxiliary gaseous hearth bed 53 and to have its forward end sag or flow toward the downwardly curved downstream end portion 55. At the same time, the outline lifting mold 57 is kept below the upper surface of the auxiliary gas hearth bed 53 including its downwardly curved downstream end portion 55 so that only the upper ends of the spring-loaded stop members 71 extend vertically upward beyond the downwardly curved downstream end portion 55 of the auxiliary gaseous hearth bed 53 to engage the downwardly sagged downstream edge portion of the glass sheet at its edge.

The first limit switch of an alternate control system based on limit switches and timer circuits starts a timer circuit controlling the vertical upward movement of the outline lifting mold 57 and the downward pivoting of the upper vacuum mold 43 at a time interval following the first limit switch actuation so that just as the leading edge of the glass sheet engages the spring-loaded stop member 71, the outline lifting mold 57 rises to the level of glass sheet support provided by the auxiliary gas hearth bed 53 and lifts the glass sheet toward the downwardly moved upper vacuum mold 43. The vacuum mold 43 reaches its extreme lower angular position as the second longitudinal rail portion 60 which contains the transverse S-shaped elements is lifting the glass toward the upper vacuum mold 43. During this upward movement, the upper ends of the stop members 71 engage the downwardly curved end portion 45 of the upper vacuum mold to cause the spring-loaded stop members 71 to become recessed into the cylindrical housings 72 and permit the second longitudinal rail portion 60 to impart an S-shaped configuration to the downstream portion of the glass sheet.

Vacuum is started in the vacuum mold 43 when the latter reaches its lower position and engages a limit switch that controls a vacuum timer circuit. In this way, the lifted glass sheet becomes engaged between the outline lifting mold 57 to which it has deformed and developed the outline shape thereof and the upper vacuum mold 43 while vacuum is applied to the vacuum mold. Thus the glass sheet is engaged by vacuum applied through the vacuum mold which then pivots upwardly again in response to a limit switch actuating a timer circuit in response to the lower mold engaging the latter limit switch to provide clearance for the ring-like member 75. When the outline lifting mold 57 engages the glass sheet against the upper vacuum mold 43, it actuates another limit switch that operates a timer that times out to lower lower outline mold 57 rapidly. Vacuum continues on the vacuum mold 43 to continue to engage the glass sheet thereagainst as the vacuum mold pivots upward about pivot support 50. The ring-like member 75, which has been in a parking position at the cooling station 14, shuttles into position beneath the upper vacuum mold 43 in response to the lifting mold 57 engaging another limit switch during its downward movement.

The ring-like member has a shape conforming to the outline shape of the glass sheet that has been imparted by the outline lifting mold 57 and the upper vacuum mold 43 so that when the upper portions of the ring-like member pass the downwardly curved downstream end portion 45 of the upper vacuum mold 43, the ring-like member engages another limit switch that controls pivoted movement of the upper vacuum mold 43 into its down position. When the ring-like member 75 is in its proper position of alignment and the upper vacuum mold is in its downwardly pivoted position, the ring-like member engages another limit switch to cause the vacuum to be discontinued (and positive pressure applied, if desired), and the glass sheet is released from engagement against the lower surface of vacuum mold 43 and drops onto the upper outline surface of the ring-like member 75. The timer circuit controlled by the last limit switch again causes upper vacuum mold 43 to be pivoted into an upper oblique position for the downwardly curved downstream end portion 45, and the ring-like member 75 containing the shaped glass sheet thereover is moved to the cooling station 14 under control of another timer circuit. Another limit switch is engaged by the ring-like member when the latter reaches the cooling station to reciprocate the ring-like member 75 between the upper and lower nozzles which apply pressurized cold air against the opposite surfaces of the glass sheet to impart a desired degree of temper. When the glass sheet has been cooled sufficiently, the latter timer circuit times out to convey the ring-like member holding the shaped glass sheet in a forward direction to the unloading station. The latter timer also causes upper plenum 83 to be lifted to provide clearance for the ring-like member 75 to pass from the cooling station 14 into the unloading station 16, if the depth of bend requires such movement for clearance. There, the ring-like member 75 actuates another limit switch that actuates a timer circuit that delays further movement of the ring-like member. The upper plenum 83 remains in its upper position until the ring-like member 75 has been unloaded with the glass sheet removed therefrom, and the last named timer circuit times out to return the ring-like member 75 to a parking position within the cooling station 14 to await the need for its movement to a position below the upper vacuum mold 43 at the shaping station 12 during the fabrication of the next succeeding glass sheet.

The form of this invention shown and described in this disclosure represents an illustrative preferred embodiment and certain modifications thereof. It is understood that various other changes may be made such as modifying the detailed construction of the spring-loaded stop members and their manner of adjustable support, for example, without departing from the gist of the invention as defined in the claimed subject matter which follows.

What is claimed is:

1. Apparatus for bending glass sheets comprising:
   an outline mold including shaping rail portions, each defining a different portion of an upwardly facing shaping surface, at least one of said shaping rail portions having a slot;

a cylindrical housing in adjustably fixed relation to said outline mold and located below said slot of said one shaping rail portions;

a glass edge engaging member extending upward from said cylindrical housing through said slot;

biasing means within said cylindrical housing to yieldingly bias said glass edge engaging member upwardly through said slot;

means operatively connected to said glass edge engaging member to limit the upwardly biased position of said edge engaging member;

an upper mold above said outline mold, said upper mold having a downwardly facing shaping surface complementary to the upwardly facing shaping surface of said outline mold; and means to move said outline mold in a vertical direction between a lowered position wherein said glass edge engaging member is extended upward by said biasing means and a raised position wherein said glass edge engagement member is biased against the force of said biasing means by said downwardly facing shaping surface of said upper mold.

2. Apparatus as in claim 1 wherein said biasing means is a spring and further wherein said glass edge engaging member is spaced from said downwardly facing shaping surface of said upper mold when said outline mold is in said lowered position.

3. Apparatus as in claim 1, further including a ring-like member movable along a path below said downwardly facing shaping surface and above said upwardly biased position of said glass edge engagement member when said outline mold is in its said lowered position, said bias limiting means allowing clearance for said ring-like member to move between said shaping surfaces.

4. Apparatus as in claim 1, further including a reinforcement frame for said outline mold, a mounting bracket adjustably secured in horizontal adjustment to said reinforcement frame, said cylindrical housing being secured in vertically adjustable position to said mounting bracket, whereby the upwardly biased position of said glass edge engaging member is adjustable in two dimensions.

5. Apparatus as in claim 1, wherein said upper mold is a vacuum mold.

* * * * *